(12) United States Patent
Jafry et al.

(10) Patent No.: US 9,112,930 B2
(45) Date of Patent: Aug. 18, 2015

(54) UPDATING SERVICES DURING REAL-TIME COMMUNICATION AND SHARING-EXPERIENCE SESSIONS

(71) Applicant: Microsoft Corporation, Redmond, WA (US)

(72) Inventors: Syed Mansoor Jafry, Kirkland, WA (US); Peter Bergler, Duvall, WA (US); Kerry D. Woolsey, Duvall, WA (US); Shawn Thomas, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 165 days.

(21) Appl. No.: 13/662,379

(22) Filed: Oct. 26, 2012

(65) Prior Publication Data
US 2014/0122726 A1 May 1, 2014

(51) Int. Cl.
*H04L 29/06* (2006.01)
*H04W 4/12* (2009.01)
*H04W 4/18* (2009.01)
*H04L 12/911* (2013.01)

(52) U.S. Cl.
CPC ............ *H04L 65/4007* (2013.01); *H04L 65/40* (2013.01); *H04L 65/4015* (2013.01); *H04W 4/12* (2013.01); *H04W 4/18* (2013.01); *H04L 47/822* (2013.01)

(58) Field of Classification Search
CPC . H04L 65/40; H04L 65/4007; H04L 65/4015; H04L 65/4023; H04L 65/403; H04L 47/822; H04W 4/12; H04W 4/18; G06F 9/5055
USPC ......... 709/203, 217, 219, 223, 227, 228, 224; 370/343, 352
See application file for complete search history.

(56) References Cited

U.S. PATENT DOCUMENTS

| 7,676,583 | B2* | 3/2010 | Eaton et al. ................... 709/227 |
| 7,783,729 | B1* | 8/2010 | Macaluso ...................... 709/220 |
| 7,849,135 | B2* | 12/2010 | Agrawal et al. ............... 709/232 |
| 7,860,525 | B2* | 12/2010 | Parkkinen et al. ............ 709/219 |
| 7,970,350 | B2* | 6/2011 | Sheynman et al. ........... 709/246 |

(Continued)

OTHER PUBLICATIONS

Kamolphiwong et al., "Real Time Communication and Collaboration," In *Keio SFC Journal*, vol. 8, No. 2, Apr. 1, 2009, pp. 7-20.

(Continued)

*Primary Examiner* — Ramy M Osman
(74) *Attorney, Agent, or Firm* — Sunah Lee; Kate Drakos; Micky Minhas

(57) ABSTRACT

Disclosed herein are representative embodiments of tools and techniques for updating services in sharing-experience sessions during communications calls. According to one exemplary technique, a first computing device initiates a communications call and receives capability information for a second computing device. The capability information for the second computing device includes information indicating attributes of a service supported by the second computing device. Additionally, the first computing device evaluates the capability information to determine that the service is supported by the first and second computing devices. The first computing device initiates a sharing-experience session that includes the service. An update message comprising update information for the service is received, and based on the received update information, content of the service is updated.

19 Claims, 10 Drawing Sheets

(56) References Cited

U.S. PATENT DOCUMENTS

| | | | |
|---|---|---|---|
| 7,991,830 B2 * | 8/2011 | Li | 709/203 |
| 8,040,874 B2 * | 10/2011 | Skog et al. | 370/352 |
| 8,073,479 B2 * | 12/2011 | Parkkinen et al. | 709/219 |
| 8,352,371 B2 * | 1/2013 | Proctor | 705/51 |
| 8,386,619 B2 * | 2/2013 | Mallet et al. | 709/227 |
| 8,396,764 B1 * | 3/2013 | Macaluso | 709/220 |
| 8,478,812 B2 * | 7/2013 | Oliver et al. | 709/203 |
| 8,572,256 B2 * | 10/2013 | Babbar | 709/227 |
| 8,725,217 B2 * | 5/2014 | Kitahara | 455/569.2 |
| 2001/0056459 A1 * | 12/2001 | Kurose et al. | 709/201 |
| 2005/0064821 A1 * | 3/2005 | Hedberg et al. | 455/67.11 |
| 2005/0255839 A1 * | 11/2005 | Perttila | 455/419 |
| 2007/0002840 A1 | 1/2007 | Song et al. | |
| 2007/0165599 A1 * | 7/2007 | Skog et al. | 370/352 |
| 2007/0286380 A1 * | 12/2007 | Hong et al. | 379/201.01 |
| 2008/0209021 A1 | 8/2008 | Shamma | |
| 2008/0263458 A1 | 10/2008 | Altberg et al. | |
| 2010/0008265 A1 | 1/2010 | Freer | |
| 2010/0017518 A1 * | 1/2010 | Holmberg | 709/227 |
| 2010/0100532 A1 * | 4/2010 | Landry et al. | 707/662 |
| 2010/0131868 A1 | 5/2010 | Chawla et al. | |
| 2011/0045816 A1 | 2/2011 | Wang et al. | |
| 2011/0165869 A1 * | 7/2011 | Guzman | 455/418 |
| 2011/0271211 A1 * | 11/2011 | Jones et al. | 715/753 |
| 2012/0036218 A1 * | 2/2012 | Oh et al. | 709/217 |
| 2012/0042102 A1 * | 2/2012 | Chung et al. | 710/33 |
| 2012/0170572 A1 | 7/2012 | Bareli et al. | |
| 2012/0225652 A1 | 9/2012 | Martinez et al. | |

OTHER PUBLICATIONS

"SMART Bridgit Conferencing Software for Distance Education," http://smarttech.com/us/Solutions/Higher+Education+Solutions/Products+for+higher+education/Software/SMART+Bridgit, Published on: Apr. 29, 2010, 1 page.

International Search Report and Written Opinion dated Jun. 30, 2014, from International Patent Application No. PCT/US2013/066446, 11 pages.

* cited by examiner

SOFTWARE 1080 IMPLEMENTING DESCRIBED TECHNOLOGIES FOR UPDATING SERVICES DURING SHARING-EXPERIENCE SESSIONS

UPDATING SERVICES DURING REAL-TIME COMMUNICATION AND SHARING-EXPERIENCE SESSIONS

BACKGROUND

As the use of the internet has grown as a tool for people to exchange information, internet technologies have been adapted to provide various tools for communicating audio and video over the internet. Some traditional tools have been capable of communicating real-time video and audio. Although these traditional tools have been capable of communicating real-time video and audio, the communication capabilities of these tools are limited.

SUMMARY

Among other innovations described herein, this disclosure presents various representative embodiments of tools and techniques for updating services in sharing-experience sessions during one or more communications calls to implement the interactivity of the services.

In one embodiment, a first computing device begins a communications call with one or more other computing devices and exchanges real-time voice and/or audio communications data between the computing devices on the communications call. Additionally, during the communications call, the computing devices that are parties to the communications call exchange capability information indicating services and/or actions supported by the respective computing devices. Also during the communications call, an interactive sharing-experience session is initiated between the computing devices determined to support at least one common action of a service, as indicated by the capability information received. The interactivity of the service is implemented by exchanging update messages for the service between the computing devices during the sharing-experience session, responsive to commonly supported actions being performed by respective instances of the service on the computing devices party to the sharing-experience session.

According to one exemplary technique, a first computing device initiates a communications call and receives capability information for a second computing device. The capability information for the second computing device includes information indicating attributes of a service supported by the second computing device. Additionally, the first computing device evaluates the capability information to determine that the service is supported by the first and second computing devices. Also, the first computing device initiates a sharing-experience session that includes the service. An update message comprising update information for the service is received, and, based on the received update information, content of the service is updated.

According to another exemplary technique, a first computing device initiates a communications call and receives capability information for a second computing device. The first computing device evaluates the capability information for the second computing device to determine that the first and second computing devices support at least one mutual action of the service. Additionally, the first computing device initiates a sharing-experience session that includes the service and performs one of the mutual action(s) of the service. Also an update message is sent that includes update information for the mutual action of the service.

According to yet another exemplary technique, a first computing device initiates a communications call and receives capability information for a second computing device. The first computing device evaluates the capability information to determine that the first and second computing devices both support first and second actions of a service. The first computing device initiates a sharing-experience session that includes the service and receives an update message comprising update information for the service. Based on the received update information, the first action of the service is performed. Also, the first computing device performs the second action of the service, and, based on the performance of the second action, a second update message is sent that includes update information for the service.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

Exemplary System for Updating Content of a Service for a Sharing-Experience Session It can be desirable for a user of a device to share content rendered or provided by the user's device in real-time with a different user of a remote device. Additionally, the user may want to share more than just real-time audio and/or video communication with users of remote devices. During a real-time audio and/or video session, the user may want to engage in an interactive sharing-experience session where the user can share interactive content such as a virtual object or data that both users can interactively engage with in real-time at their respective devices.

Figure 1:
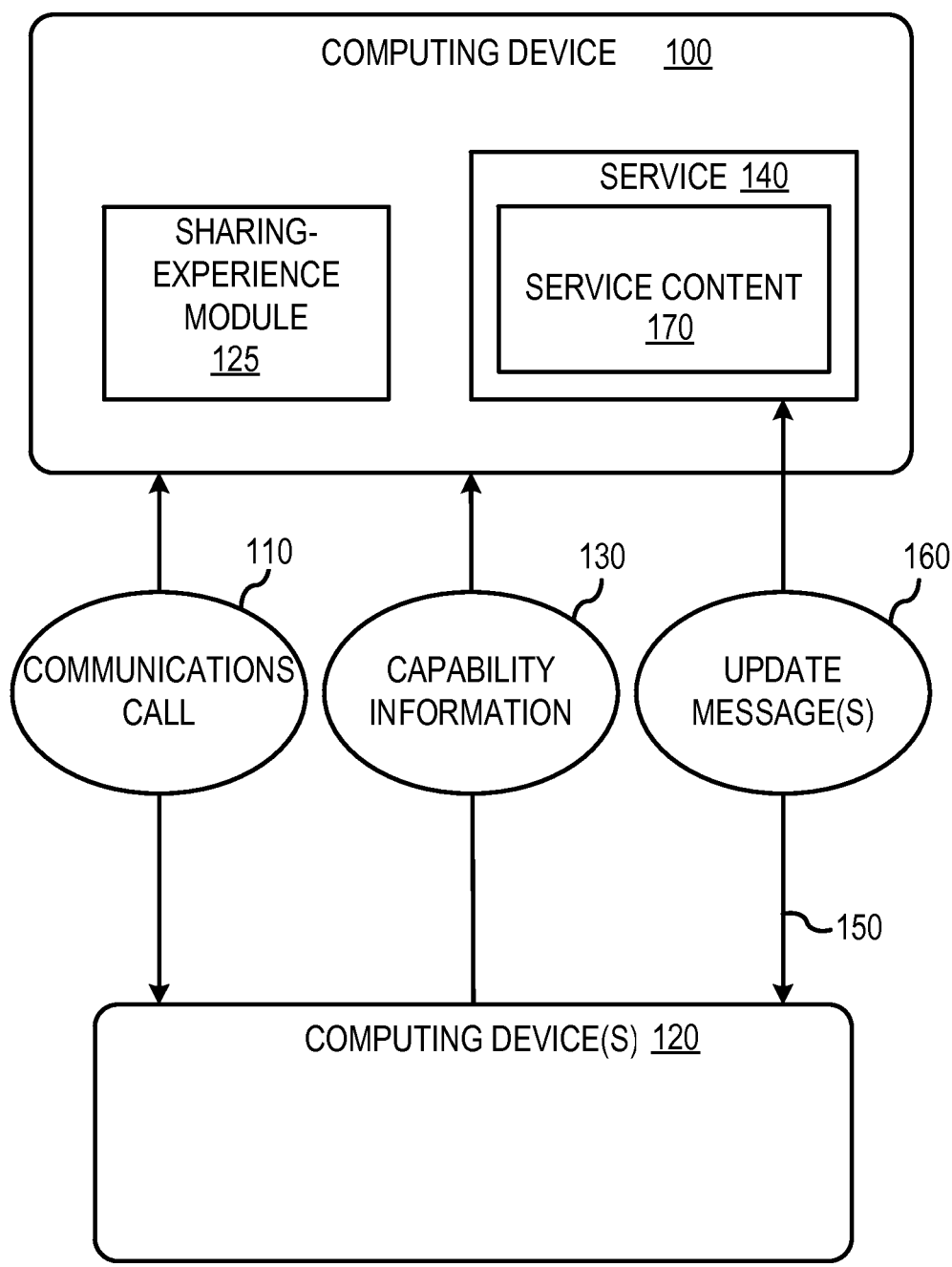
FIG. 1 is a diagram that illustrates an exemplary computing device for updating content of a service for a sharing-experience session.

FIG. 1 is a diagram that illustrates an exemplary computing device 100 for updating content 170 of a service 140 for a sharing-experience session. In FIG. 1, the computing device 100 initiates a communications call 110 with one or more computing devices 120. The computing devices 100, 120 can have the same form factor/device type or different form factors/device types. During the communications call 110, the computing device 100 receives capability information 130 for the one or more computing devices 120 participating in the communications call 110. The capability information 130 indicates one or more attributes of one or more services supported by the one or more computing devices 120. For example an attribute of a service can be an identifier of the service, a version number of the service, or one or more actions and/or commands supported by the service. In some implementations, a service can provide interactive real-time sharing and control of virtual objects of various levels of complexity and/or sharing of application content or states. The levels of complexity can range from a high level of complexity to a low level of complexity.

The computing device 100 uses a sharing-experience module 125 to evaluate the received capability information 130 to determine that one or more services such as service 140 are supported by each of the one or more computing devices 120 and also supported by the computing device 100, and are available for one or more sharing-experience sessions such as sharing-experience session 150 for service 140. The computing device 100 using the sharing experience module 125 can initiate one or more sharing-experience sessions such as the sharing-experience session 150 for the service 140 that is supported by each of the one or more computing devices 120. A sharing-experience session can use a communications channel between the computing device 100 and the one or more computing devices 120 to send and/or receive one or more messages such as the one or more update messages 160. In a sharing-experience session, a service can provide one or more interactive experiences such as a shared-book reading experience, virtual-object sharing, gaming, remote highlighting, or the like. A sharing-experience session can include multiple services for different interactive experiences.

In an exemplary implementation of a service, the service provides interaction with a virtual object during a sharing-experience session. During an sharing-experience session for this service, over a communications call between various devices, users can use the audio and video capabilities of the communications call to communicate about a floor plan of a building, and the users can use the capabilities of the service to interact with a virtual object that shows a three dimensional model of the floor plan of the building being discussed. The building model can be interacted with using supported actions of the service, which provides capabilities for displaying, manipulating, and updating the content of the service.

With reference to FIG. 1, responsive to receiving at least one of the one or more update messages 160 the computing device 100 updates content 170 of the service 140. For example, an update message can be received by the computing device and the content provided by the service can be put into a state that is controlled and/or directed by the information provided in the update message. For example, in the example of the sharing-experience session with the interactive building model, when one user interacts with the building model at the user's device according to a common capability, the device automatically sends messages to the other participating devices to reflect the changes to the building model on the respective devices of the other users, allowing the other users to see the changes to the model in a real-time interactive experience. In some implementations, the update messages sent to update the services on remote devices include data that can be interpreted by the service and can communicate the changes in an efficient manner. The update messages can control the updating of services when received and the update messages can include enough information to reconstruct or reflect a service's state across the computing devices participating in the sharing-experience session.

Figure 2:
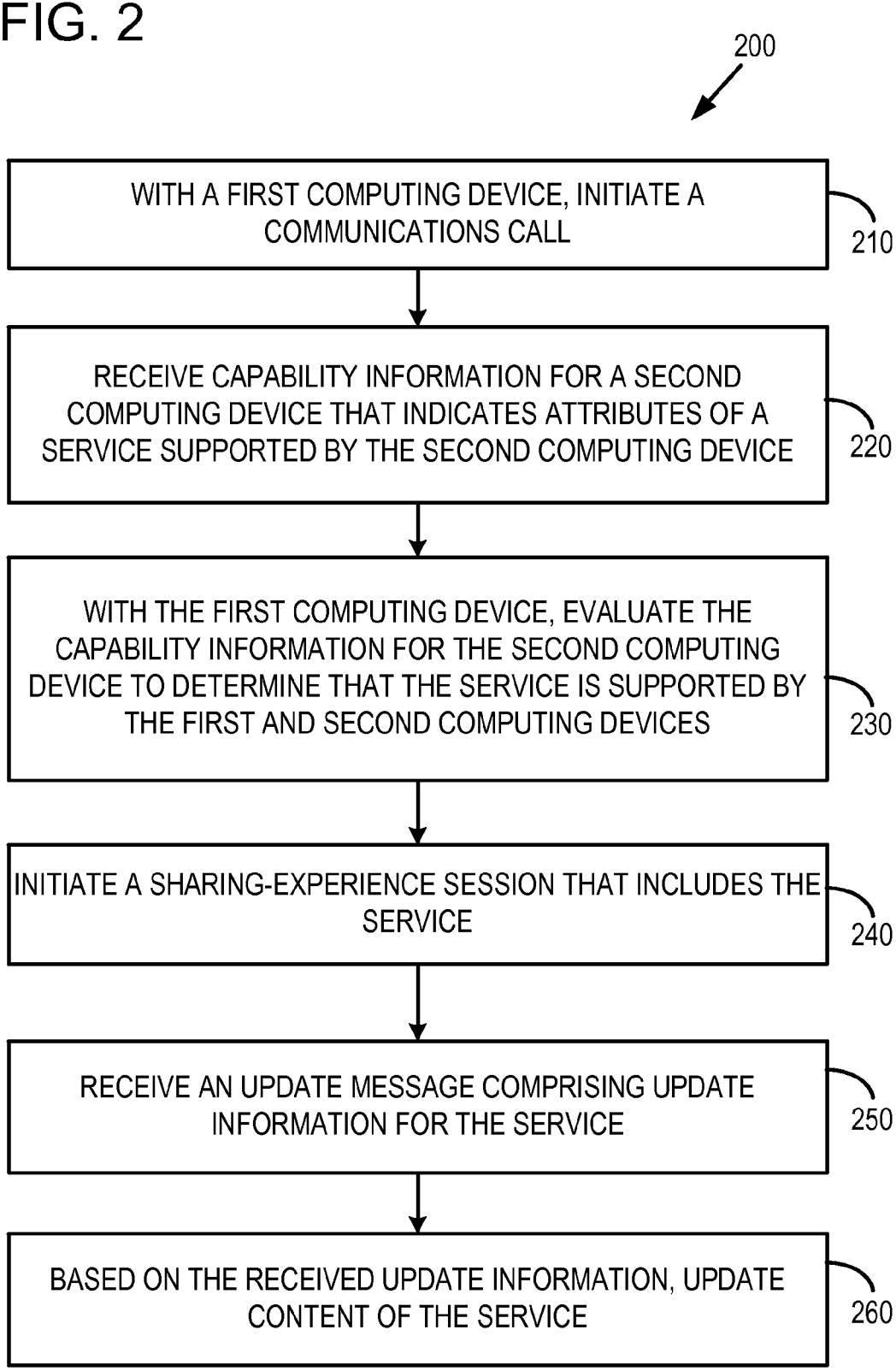
FIG. 2 is a flow diagram of an exemplary method for updating content of a service for a sharing-experience session.

Exemplary Method of Updating Content of a Service for a Sharing-Experience Session FIG. 2 is a flow diagram of an exemplary method 200 for updating content of a service for a sharing-experience session. In FIG. 2, a first computing device initiates a communications call at 210. For example, the first computing device can send an invitation to one or more other computing devices to start a communications call. The communications call can support real-time communication through transfer of data over a data channel between the computing devices on the communications call. The data channel for the communications call can support one or more of voice communication, video communication, or information used for sharing-experience sessions. For example the communications call can be a video and voice call streaming over the internet between two computing devices that use a voice over internet protocol (VOIP) to exchange communication data. In some implementations, a communications call can be initiated and conducted by a communications call module that implements the functionality of the communications call at the computing device using computer-executable instructions.

In some implementations of initiating a communications call, a second computing device sends an acceptance of the sent invitation, which is received by the first computing device. In response to the acceptance of the invitation, the communications call between the first and second computing devices can be authorized and/or started, and communications can be transferred between the first and second computing devices over the data channel during the communications call. Once the second computing device that is called and/or invited accepts the invitation to begin the communications call, the first and second computing devices can carry out media negotiations that can include determining audio and/or video formats supported by each computing device, bandwidth supported, resolution support, or the like. After the media negotiations are completed, the audio and/or video streams can be sent between the computing devices participating in the communications call according to the result of the media negotiations.

In some implementations, in initiating a communications call, the first computing device can receive a request to start a communications call with another computing device, and the first computing device can send an acceptance of the request to begin the communications call between the first and second computing devices. In response to receiving the acceptance from the first computing device, the second computing device can begin the communications call with the first computing device.

At 220, capability information for a second computing device is received. The capability information for the second computing device includes information indicating attributes of a service supported by the second computing device. For example, the second computing device can be capable of supporting one or more services, each with one or more actions and/or commands. The second computing device can send information about the one or more services it supports. For example, capability information can include a service identifier, a service version number, supported actions, supported commands, hardware available for the service, and the like. A service identifier can uniquely identify a service that is supported by a computing device. Additionally, the capability information can include information about one or more schema according to which data for the service are organized. Capability information can also include information about the processing capacity, memory capacity, display resolution and network connection speed available to a device.

A service can have various versions, and a service version number can uniquely identify a version of a service. For example, a service can have a set of supported actions in a first version. In a second version, the service can support one or more of the set of supported actions of the first version and one or more actions not supported by the first version. A version identifier can be used to determine that a service is compatible to be used between computing devices. For example, versions of the service on various devices can be compared for compatibility.

The capability information can include information about one or more actions that are supported by the one or more services available to (e.g., supported by) the second computing device. A service can have a set of actions that are available for the service, and the service can be fully or partially supported on a computing device. For example, the service can support a first set of the available actions on a first device, and a second device can support a second set of the available actions of the service. The first and second sets of available actions can include one or more mutual actions that are common between the sets or one or more actions that are not common to both sets (and are included in one set and not the other set of actions). For example, a first device with a small display screen can have partial support for a service, and can support an action of the service that allows for the consumption of information shared by the service on a second device, but a device with a larger screen can have full support of the service and can support multiple actions that allow for a user to interact and modify a virtual object in real-time.

The capability information can relate to a single service. Or, the capability information can relate to multiple services. For example, the capability information for the second computing device indicates attributes of a first service and attributes of a second service supported by the second computing device.

In some implementations, capability information is sent and/or received at various times. For example, the capability information can be sent during the initiating of the communications call and/or during the media negotiations. Also, for example, capability information can be sent or received upon request. In some implementations, a computing device can request and/or receive a portion or all of the capability information of another computing device. For example, a computing device can request a set of service identifiers of services supported by a different device, and the different device can send the capability information in response to the request. Also for example, a first computing device can request capability information for a particular service such as information about one or more actions and/or commands of the service supported by another device and/or information about the version or versions of the service on the other device. In addition to or instead of receiving capability information for the second computing device, the first computing device can send capability information for the first computing device to the second computing device (and/or another computing device), indicating attributes of service(s) supported by the first computing device.

More generally, the computing devices negotiate capabilities for services of one or more sharing-experience sessions. Different endpoints may have different form factors (e.g., desktop computer, smartphone, tablet) or resources. For a given service, the actions, commands, formats, etc. supported by a computing device can be exchanged with other computing devices, along with information about hardware capabilities. The set of actions, commands, formats, etc. can be specific to the service and otherwise opaque to the computing device and other services.

Or, the actions, commands, formats, etc. for a service can follow a schema. In this case, multiple services can use the same schema. Data for a service follow the schema, for example, and actions or commands may be selected from those defined in the schema. As part of capability negotiation, computing devices can indicate which schema are supported.

With reference to FIG. 2, at 230, the first computing device evaluates the capability information for the second computing device to determine that the service is supported by the first and second computing devices. For example, information about one or more attributes of the service is evaluated and compared to capability information of the first computing device to determine that the service is supported by both the first and second computing devices and/or that the service has mutual attributes at the first and second computing devices that enable a sharing-experience session. For example, the capability information of the second computing device can include an identifier of the service it supports, which can be compared to the identifiers of one or more services supported by the first computing device to determine that the first computing device also supports the identified service. If service identifiers compared for respective computing devices identify the same service, then the computing devices can be determined to support that service.

In some implementations, one or more actions of a service indicated in the capability information for the second computing device can be compared to one or more actions of the service supported by the first computing device. Different devices may support different sets of actions for a service, depending on type of device, version of service or another factor. If there is at least one action (e.g., a mutual action) supported by the second computing device that is also supported by the first computing device, then the service can be supported by the first and second computing devices, and the action can be available for and/or enable a sharing-experience session. The mutual action supported by the first and second computing devices can be used to provide the service during the sharing-experience session.

In some implementations, when capability information is exchanged between first and second computing devices and there are no services and/or actions of services that are supported by both the first and second computing devices, then no sharing-experience session is enabled between the first and second devices for a service. In this case, the first and second devices cannot initiate a sharing-experience session for a service that would allow the exchange of messages for the service because no common service is supported.

At 240, the first computing device initiates a sharing-experience session that includes the service. For example, the first computing device can send a request to begin a sharing-experience session that allows the service to be provided between the first and second computing devices. In some implementations of initiating a sharing-experience session, the second computing device sends an acceptance in response to receiving a request to begin the sharing-experience session that was sent from the first computing device. Alternatively, the second computing device sends a request to establish a sharing-experience session, and the first computing device sends an acceptance of the request as part of the initiating the sharing-experience session. After a request to begin the sharing-experience session has been accepted, the sharing-experience session can begin in response to the acceptance. The sharing-experience session begins such that a communications channel is authorized and made available to exchange messages to provide functionality of the service between the first and second computing devices. In some implementations, both the first and second computing devices are in a communications call during the initiating of a sharing-experience session between the computing devices and during the sharing-experience session. In some implementations, a request to begin a sharing-experience session for a service can be sent from a computing device that supports at least one action of the service that is also supported by the computing device receiving the request. The initiation of the sharing-experience session can include launching an application for the service and/or other operations.

Within the same sharing-experience session, the first computing device can initiate a second service, third service, and so on. This allows the computing devices to reuse settings, resources, etc. from the sharing-experience session, and avoid additional messages to establish a new sharing-experience session. Alternatively, the first computing device initiates a second sharing-experience session for a second service, third sharing-experience session for a third service, and so on.

At 250, an update message comprising update information for the service is received. For example, during the sharing-experience session for the service, the second computing device can send a message with information to update the service at the first computing device. The first computing device can receive the update message with the update information sent by the second computing device. The update message can be sent by the service on the second computing device in response to an action being performed that changes the state of the service on the second computing device.

At 260, based on the received update information, content of the service is updated. For example, the update information of an update message can control the functionality of the service on the first computing device when received. For example, the update message can be interpreted by the service and change the state of the service, change a displayed virtual object, or cause functionality of the service to be performed. In general, the information in an update message can be information to reconstruct the state or content of the service on a receiving device to reflect a change to content of the service or functionality performed by the service on a device that sent the update message. The first computing device can also send one or more update messages responsive to performance of action(s) of the service at the first computing device. Such an update message includes, for example, update information to direct the performance of the action at the second computing device.

Update messages can be lightweight to implement an intelligent exchange of data. In this case, the update message payload can convey an amount of data that can be interpreted to allow a receiving service to determine an updated state at a receiving computing device. For example, one exemplary service is a shared book-reading service, where a book is rendered at multiple devices to reflect a similar state based on updates received from one or more of the multiple devices. In the book-reading service, when a virtual book is turned to a new page on a particular computing device, the particular computing device can send an update message with the page number of the new page to the other computing devices in the sharing-experience session.

The computing devices that receive the update message can use the update message information to reconstruct the state and/or content of the service as modified on the sending computing device. For example, in the book-reading service, the other participating computing devices can turn pages of their respective virtual books to display the page indicated in the update message. The services can interpret the update message and independently render the new page. For example, for a high-end device, the service can provide animation effects of moving from a previous page to the new page, whereas the service simply changes text on a low-end device. In some implementations, the update message does not include information that is displayed by the updated state of the service as the service provides the information. For example, when a page of the virtual book is turned, the color of the page can be omitted from the update message, as the service for the book-reading experience can provide the color information. Thus, the update message can convey semantic data that can be interpreted by the service on the receiving computing device to recreate and/or synchronize the state of the service with the state of the service on the sending computing device.

In another example of a sharing-experience session, a user of the first computing device captures video of an event. The sharing-experience session is for a service that provides one or more actions implementing a highlighting capability for a video broadcast. In this example, using the service supported by the first computing device, the user can broadcast the captured video to the computing devices of various subscribers. The second computing device can be one of the computing devices receiving the video broadcast. The users of the receiving computing devices can remotely highlight areas in the video capture and the highlighted areas can be reflected across the video broadcast, including at the first computing device. The service can highlight areas of the video broadcast at the first computing device by receiving and interpreting update messages sent from the various other computing devices participating in the sharing-experience session. The update messages can include frame timestamps, frame numbers or other timing information, as well as coordinate information for highlighted regions. The updating of services in sharing-experience sessions can allow multiple users of computing devices to participate and manipulate shared data of a service in real-time along with communicating in real-time in a communications call.

In some implementations of a sharing-experience session, after the sharing-experience session has begun, each participating device supporting the service of the sharing-experience session can be responsible for rendering and/or providing the resulting interactive experience of the service, sending and/or receiving update messages reflecting changes and/or updates at the device, and rendering updated states of the service, so that the content of the service can be rendered to be displayed on the device for user viewing and/or consumption. As a result, each participating computing device can work with its own copy and/or instance of the service, which can be synchronized with other copies of the service on other participating computing devices. The synchronization can be implemented by exchanging update messages for controlling the states of the respective copies of the service on the computing devices engaged in the sharing-experience session.

Figure 3:
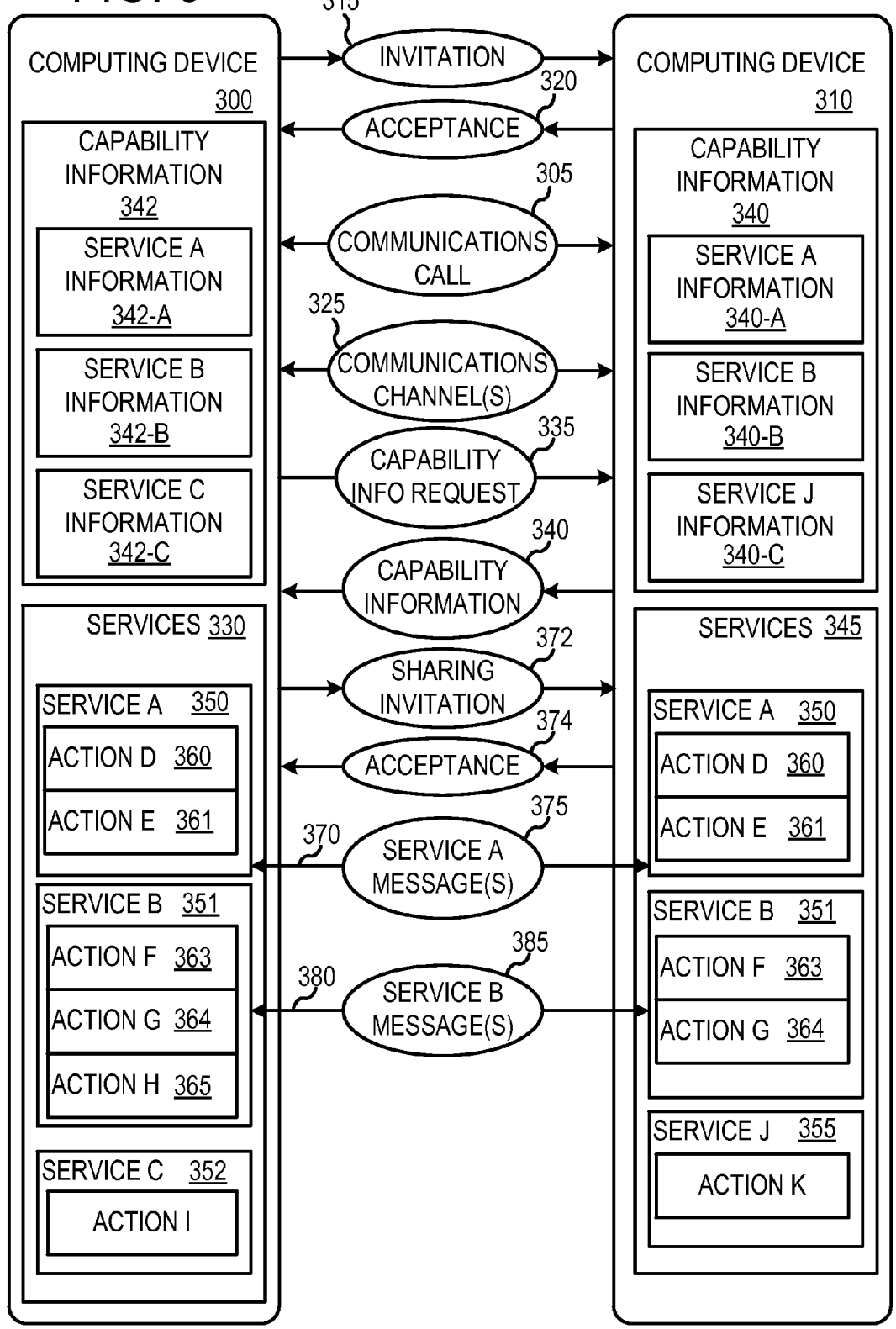
FIG. 3 illustrates an exemplary computing device that can provide one or more sharing-experience sessions for one or more services during a communications call.

Exemplary System for Providing Sharing-experience Sessions for Services during a Communications Call FIG. 3 is a diagram illustrating an exemplary computing device 300 that can participate in one or more sharing-experience sessions for one or more services during a communications call. In FIG. 3, the computing device 300 initiates a communications call 305 with computing device 310 using a communications call module. In initiating the communications call 305, the computing device 300 sends an invitation 315 to the computing device 310 to begin the communications call 305. The computing device 310 receives the invitation 315 and accepts the invitation 315 by sending an acceptance 320 of the invitation 315 that is received by computing device 300. The invitation 315 and acceptance 320 can be communicated as data using one or more communications channels 325. Responsive to the acceptance 320, the computing device begins the communications call 305 with computing device 310 using one or more of the communications channels 325. The communications call 305 is a video call which supports real-time voice and/or video communication between the computing devices 300 and 310. The communications call 305 can be implemented using internet technologies such as a voice over internet protocol (VOIP).

When the computing device 300 is participating in the communications call 305 a service of the services 330 supported by computing device 300 is available for a sharing-experience session if another computing device participating in the communications call 305 also supports the service. While participating in the communications call 305, the computing device 300 sends a request 335 for capability information of computing device 310. Responsive to receiving the request 335, the computing device 310 sends its capability information 340, which is received by computing device 300. The capability information 340 for computing device 310 includes information 340-A about attributes of service A 350, information 340-B about attributes of service B 351, and information 340-C about attributes of service J 355 as supported by computing device 310. Computing device 300 can also send its capability information 342 to computing device 310. The capability information 342 for computing device 300 includes information 342-A about attributes of service A 350, information 342-B about attributes of service B 351, and information 342-C about attributes of service C 352 as supported by computing device 300.

After the computing device 300 receives the capability information 340, it can evaluate which of the services 345 that are supported by computing device 310 (as indicated by the capability information 340) are also supported by the computing device 300. In FIG. 3, the capability information 342 indicates that computing device 300 supports the service A 350, the service B 351, and the service C 352. The capability information 340 indicates that computing device 310 supports the service A 350, the service B 351, and the service J 355. The service A 350 supports actions D, E 360-361 on the computing device 300 and the computing device 310.

The service B 351 supports actions F, G, H 363-365 on computing device 300. However, the service B 351 supports actions F, G 363-364 on computing device 310 but does not support action H 365 on computing device 310. Because the computing device 300 and the computing device 310 both support services A, B 350-351 and the services A, B 350-351 include actions F, G supported by both computing devices 300 and 310, computing device 300 determines that each of the services A, B 350 and 351 is available for a sharing-experience session between the computing devices. Because computing device 310 supports the service J 355 but computing device 300 does not support the service J 355, the computing device 310 determines that the service J 355 is not available for a sharing-experience session between the computing devices. Additionally, because computing device 300 supports the service C 352 but computing device 310 does not support the service C 352, the computing device 300 determines that the service C 352 is not available for a sharing-experience session between the computing devices.

The computing device 300 can initiate one or more sharing-experience sessions with computing device 310 for one or more of the services that are determined to be available for a sharing-experience session between the computing devices. If a service is determined to be unavailable for a sharing-experience session between the devices, the computing device 300 does not initiate a sharing-experience session for the unavailable service.

As service A 350 has been determined to be available for a sharing-experience session, the computing device 300 initiates a sharing-experience session 370 for the service A 350. The initiating of the sharing-experience session 370 by the computing device 300 includes sending an invitation 372 to begin the sharing-experience session 370 and receiving an acceptance 374 of the invitation 372. The acceptance 374 of the invitation 372 is sent from computing device 310 to computing device 300. The initiating of the sharing-experience session 370 also includes beginning the sharing-experience session 370 in response to receiving the acceptance 374 from the computing device 310. The sharing-experience 370 allows the service A 350 as supported on computing device 300 to be updated by interpreting one or more of the messages 375 sent by computing device 310, which are generated for use by service A 350. Also, the sharing-experience 370 allows the service A 350 as supported by computing device 310 to be updated by interpreting one or more of the messages 375 sent by computing device 300, which are generated for use by service A 350.

A message of the messages 375 can be an update message with information to control and/or change the state of the service A 350 on the computing device receiving the message. For example, the service A 350 can allow for a three dimensional model (3-D model) of a physical object or structure to be oriented in three dimensions so that the 3-D model can be viewed at various angles on a display of the computing device supporting the service A 350. A user of the computing device 310 can use a user interface to invoke the action D 360 supported by the service A 350 that changes the orientation of the 3-D model as rendered and displayed by computing device 310 as a result. Responsive to the service being updated by invoking the action D 360 at computing device 310, the computing device 310 can send an update message to the service A 350 on computing device 300. The update message can include information to invoke the action D 360 of the service A 350 at the computing device 300 to produce a resulting state of the service A 350.

As service B 351 has been determined to be available for a sharing-experience session, the computing device 300 also initiates a sharing-experience session 380 for the service B 351. The sharing-experience 380 allows the service B 351 as supported on computing device 300 to be updated by interpreting one or more of the messages 385 sent by computing device 310, which are generated for use by service B 351. As the computing device 310 does not support action H 365 of service B 351, the functionality of the action H 365 is not available for the sharing-experience session 380, and the computing device 300 does not send messages to invoke the action H 365 during the sharing-experience session 380.

However, the sharing-experience 380 allows the service B 351 as supported on computing device 300 to be updated by interpreting one or more of the messages 385 sent by computing device 310, which can be generated to invoke the functionality of one or more of the actions supported by each of the computing devices participating in the sharing-experience session 380, such as the action F 363 and the action G 364.

Figure 4:
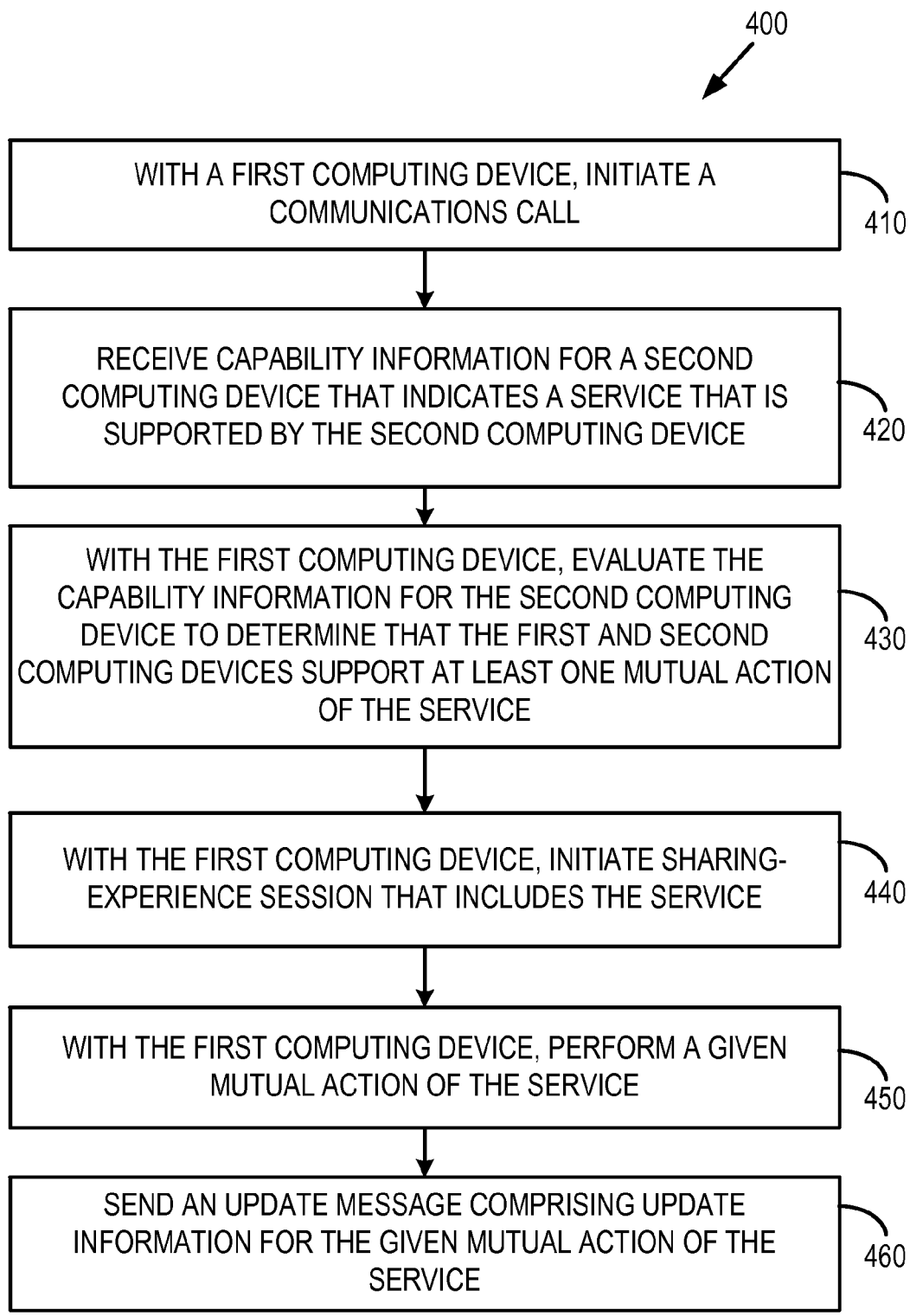
FIG. 4 is a flow diagram of an exemplary method for sending an update message for a service during a sharing-experience session.

Exemplary Method of Sending an Update Message for a Service during a Sharing-Experience Session FIG. 4 is a flow diagram of an exemplary method 400 for sending an update message for a service during a sharing-experience session. In FIG. 4, a first computing device initiates a communications call at 410. For example, the first computing device sends an invitation to begin a communications call with one or more computing devices over a data communications channel, and the invitation is accepted by one or more of the invited computing devices. Responsive to receiving the acceptance to the invitation, the first computing device begins the communications call with the computing device(s) that accepted the invitation. The communications call can support real-time voice and/or video communications using internet or other communications technologies. In some implementations of a communications call, responsive to a user selection received at a computing device, video and/or audio can be enabled or disabled for the communications call at the computing device receiving the user selection. A computing device participating in a communications call that supports both audio and video can be configured to provide the audio and/or video or to not provide the audio and/or video during the communications call.

At 420, capability information for a second computing device is received that indicates a service that is supported by the second computing device. For example, a second computing device can be a computing device that is participating in the communications call with the first computing device. The second computing device can support one or more services that can be used in sharing-experience sessions. The second computing device can send information about attributes of the one or more services that it supports to the first computing device. In some implementations, the second computing device sends the capability information in response to a request for the capability information from the first computing device. In another implementation, the second computing device sends the capability information to the first computing device automatically during the communications call in response to the initiating of the communications call.

At 430, the first computing device evaluates the capability information for the second computing device to determine that the first and second computing devices support at least one mutual action of the service for a sharing-experience session. For example, a mutual action of a service can be an action that both the first and second computing devices support for the service. In some implementations, the capability information includes information about services and actions supported by the second computing device. The first computing device compares information about the services and actions that it supports with the capability information of the second device, so as to determine which services and actions the first and second computing devices support in common and are compatible for sharing-experience sessions. A service commonly supported by the computing devices can be a mutual service, and actions commonly supported by the computing devices can be mutual actions. If the first computing device determines that the second computing device does not support any mutual action for a given service, the first computing device can evaluate whether to start a sharing-experience session for a different service with mutual actions supported by the first and second computing devices.

At 440, the first computing device initiates the sharing-experience session that includes the service. For example, because the first computing device determined mutual services that are supported, the identified mutual services are available for sharing-experience sessions between the first and second computing devices. In some implementations, the first computing device can send an invitation to the second computing device to begin a sharing-experience session, and the invitation is accepted by the second computing device. Responsive to receiving the acceptance, the first computing device begins the sharing-experience session associated and/or identified with the invitation.

At 450, the first computing device performs one of the at least one mutual action of the service. For example, during the sharing-experience session, the first computing device performs a given action identified as supported by both the first and second devices. The given mutual action is performed and the service is updated at the first computing device according to the result of the action performed.

At 460, an update message is sent that includes update information for the given mutual action of the service. For example, in response to the mutual action of the service being performed, the first computing device can send update information to the second computing device, which can be used by the service at the second computing device to perform the mutual action as supported by the second computing device to update the service at the second computing device. The first computing device can also receive an update message from the second computing device and, based on update information in the update message, update content of the service at the first computing device.

Exemplary Sharing-experience Session during a Communications Call

Figure 5:
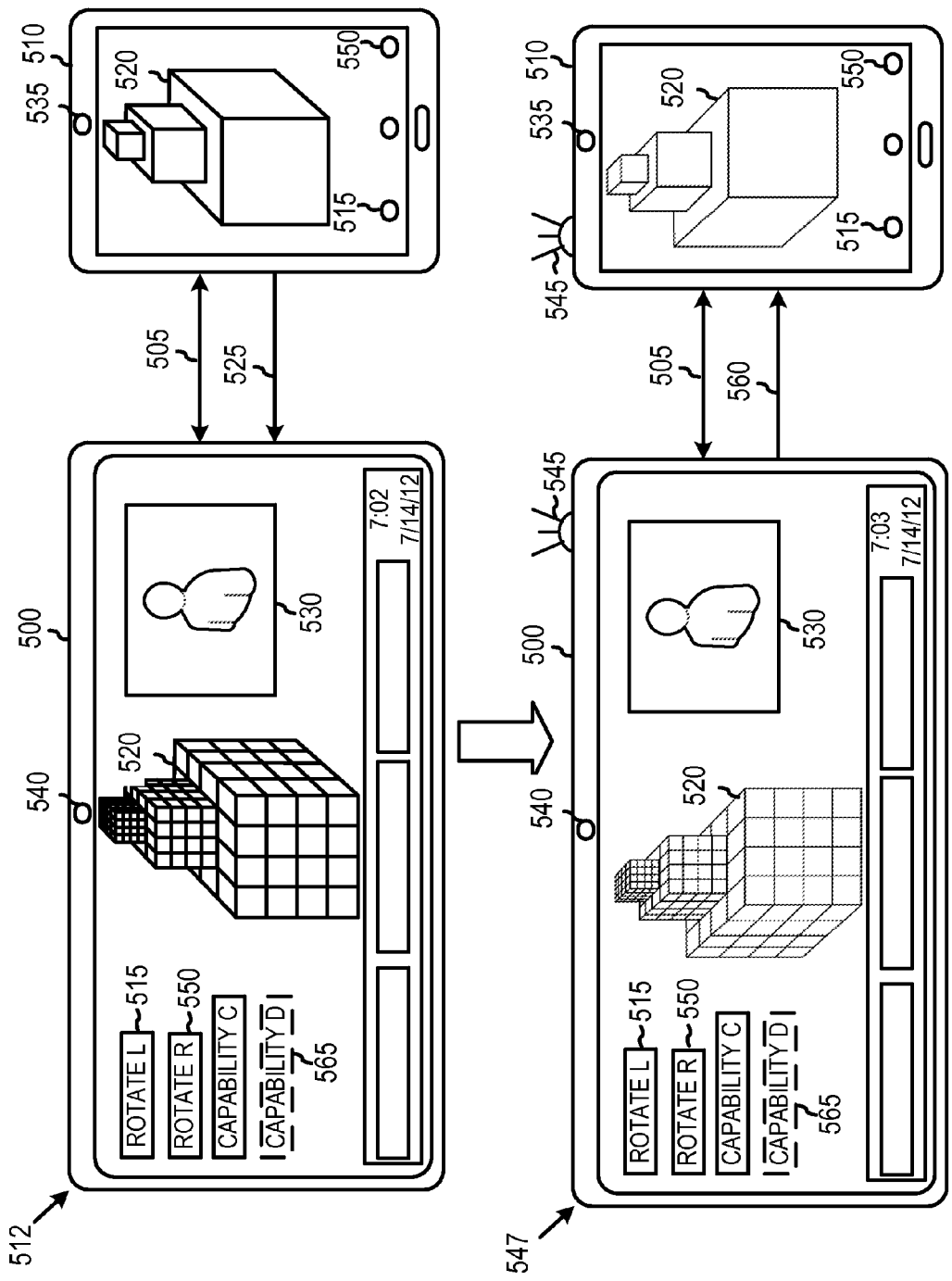
FIG. 5 is a diagram that illustrates an exemplary computing device that can receive and send update messages for updating a service in a sharing-experience session during a communications call.

FIG. 5 is a diagram that illustrates an exemplary computing device 500 that can receive and send update messages for updating a service in a sharing-experience session during a communications call 505. In FIG. 5, the computing device 500 is in a communications session 505 with a computing device 510. At 512, the computing device 510 performs an action 515 also supported by the computing device 500 that rotates a virtual object 520 in a first direction to update the state of the service. When the state of the service is updated, the virtual object 520 is displayed as rotated according to the performed action at the computing device 510. In FIG. 5, the service allows for users of the service on multiple devices to manipulate a three-dimensional virtual object in real time, so that the users of the devices participating in a sharing-experience session can view the three dimensional object from a common perspective. In responsive to the action 515 being performed at the computing device 510, the computing device 510 sends an update message to update the virtual object 520 that is displayed at the computing device 500, and the state of the service is updated at the computing device 500. The virtual object 520 can be displayed differently at different devices based on the capabilities of the device. For example, the virtual object 520 is displayed with more detail at computing device 500 than at computing device 510.

In some implementations of a service, depending on the capabilities of the device supporting the service, the service can be fully or partially supported. The actions performed for the service can update the state of the service so that the service is in a similar and/or same state at the devices participating in the sharing-experience session, but the content of the services at the various devices can be displayed according to the rendering capabilities of the service on the respective computing devices.

The virtual object 520 is updated during a communications session 505, and the computing device 500 displays video 530 of the communications session. The video 530 is real-time streaming video captured and sent by the computing device 510 to computing device 500. The video 530 can be captured using a camera 535 of the computing device 510. Also, the computing device 500 can capture and send real-time video to the computing device 510 using the camera 540 as part of the communications call 505. The computing device 500 and the computing device 510 can communicate real-time audio 545 such as voice data as part of the communications call 505 during one or more sharing-experience sessions.

At 547, the computing device 500 performs the action 550 that rotates the virtual object 520 in a second direction to update the state of the service at the computing device 500. Responsive to the action 550 being performed, the computing device 500 sends an update message 560 as part of the sharing-experience session for the service to update the virtual object 520 at the computing device 510.

The action 565 supported by the copy of the service on the computing device 500 is not supported by the copy of the service on the computing device 510, and is not available to be performed as part of the sharing-experience session for the service between the computing device 500 and the computing device 510.

Exemplary Remote Launching of Applications during a Sharing-experience Session

Figure 6:
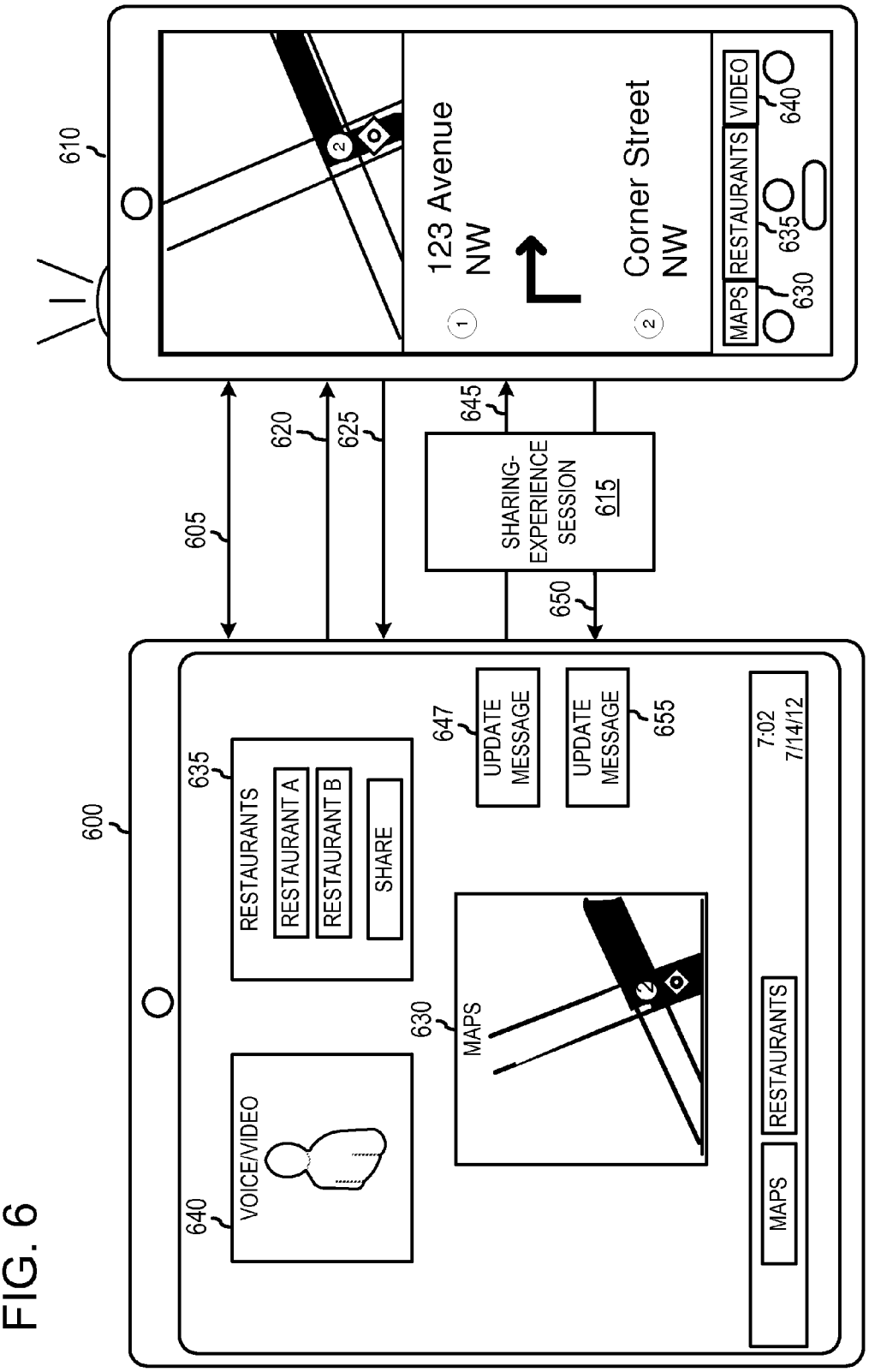
FIG. 6 is a diagram that illustrates an exemplary computing device that can remotely launch applications that provide various supported services available for a sharing-experience session during a communications call.

FIG. 6 is a diagram that illustrates an exemplary computing device 600 that can remotely launch applications that provide services that can exchange update messages for updating the services in a sharing-experience session during a communications call 605. In FIG. 6, the computing device 600 is in a communications session 605 with a computing device 610. The user of device 600 can share the content and state of applications with the remote user of the computing device 610 using a sharing-experience session 615. To begin the sharing-experience session 615, the computing device 600 sends an invitation 620. Responsive to receiving the invitation 620, the computing device 610 can display a user interface option for the user to accept the invitation or deny the invitation. As shown at 625, the computing device 610 sends an acceptance of the invitation 620 to authorize the beginning of a sharing-experience session 615.

In some implementations, the acceptance of an invitation to a sharing-experience session can authorize the use of one or more services available for a sharing-experience session on the device. For example, an acceptance can authorize the use of a service identified in an invitation for a sharing-experience session or the acceptance can identify one or more services authorized for use with the accepted sharing-experience session. In FIG. 6, for the sharing-experience session 615, the acceptance, as shown at 625, authorizes the services commonly available to the computing device 600 and the computing device 610. In this way, after the protocol for invitation/acceptance of the session is completed, services can be launched quickly without a separate invitation/acceptance step, or with a simple approval step from a user.

In FIG. 6, the services that are available to both the computing device 600 and the computing device 610 are the services provided by the application 630 and the services provided by the application 635. Concurrently with one or more sharing-experience sessions, the communications call 605 between the computing device 600 and the computing device 610 can provide real-time streaming video and/or audio data 640 between the device 600 and the device 610 using one or more communications technologies such as VOIP and/or a video transmission technology. The computing device 600 can share the content of a service of the application 635 using the sharing-experience session 615. For example, a user of the computing device 600 may want to share the content of the application that the user is manipulating at the computing device 600 with the remote user of the computing device 610 as part of the sharing-experience session 615.

At 645, the computing device 600 performs an action of a service provided by application 635 and sends an update message 647 to the computing device 610 to update the copy of the service at the computing device 610. If the application that provides the service associated with the update message 647 is not launched or running at the computing device 610, the application and/or service can be activated responsive to receiving the update message 647 for the service. After the service is launched and available, the copy of the service can be set to a state using the update information of the update message 647, reflecting the state of the copy of the service on the computing device 600. In some implementations, before launching an application and/or service at the computing device 610, the computing device 610 can allow or deny the action based on receiving a user selection indicating an allowance or denial of the action. The user can indicate an allowance or denial of the action by selecting an option provided by a user interface on the computing device 610.

At 650, the computing device 610 sends an update message 655 for a service provided by the application 630 to the computing device 600. In response to receiving the update message 655 for the service provided by the application 630, the instance of the service of the application 630 can be updated at the computing device 600 to reflect the state of the service at the computing device 610. In some implementations, if the application of 630 is not launched and/or active, the application 630 can be launched and or activated responsive to receiving the update message for the service provided by the application 630. For a map application, for example, the update message can indicate a current location of a computing device, such that the location is displayed at each of the computing devices in the sharing-experience session. Or, instead of device location, the location of a desired destination can be shared between computing devices in the sharing-experience session.

Figure 7:
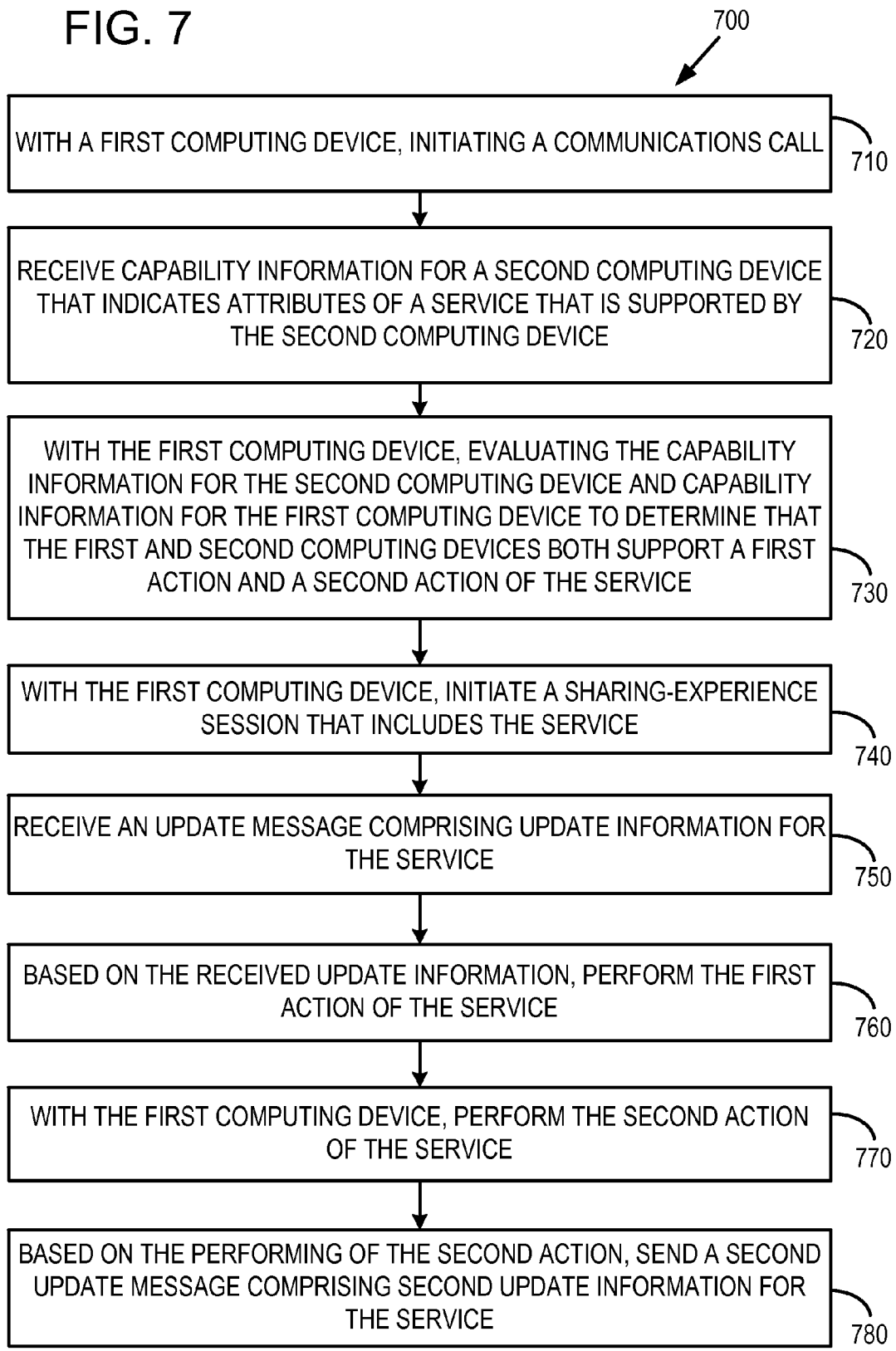
FIG. 7 is a flow diagram for an exemplary method for sending an update message for a service based on the performance of an action of the service.

Exemplary Method of Sending an Update Message for a Service Based on the Performance of an Action of the Service FIG. 7 is a flow diagram for an exemplary method 700 for sending an update message for a service based on the performance of an action of the service. In FIG. 7, the first computing device initiates a communications call at 710. For example, the first computing device begins a communications call in response to a second computing device accepting an invitation to begin the communications call.

At 720, capability information for a second computing device is received that includes information that indicates one or more attributes of a service that is supported by the second computing device. For example, the second computing device sends capability information about the services that it supports, which is received by the first computing device. In some implementations, capability information can be requested. For example, the first computing device can request capability information that includes one or more of identifiers for supported services and/or more detailed information about supported services such as version numbers and/or actions supported by the services.

At 730, the first computing device evaluates the capability information for the second computing device and capability information for the first computing device to determine that the first and second computing devices both support a first action and a second action of the service. For example, the first computing device compares the actions indicated as supported in the capability information of the second computing device with the actions supported by the first computing device (as indicated by capability information at the first computing device) to determine actions supported by both the first and second computing devices. Based on the comparison, the first computing device can determine that a first action is supported by both the first and second computing devices, and that a second action is supported by both the first and second computing devices. In some implementations, the first action can be a different action than the second action. In some implementations, a mutually supported action can be an action supported by the same or different versions of a service on the first and second devices. In an exemplary implementation, a first version of the service can support a particular action on the first computing device and a second version of the service can support the particular action on the second computing device. The way the action is supported can vary between versions of the service.

At 740, the first computing device initiates a sharing-experience session that includes the service. For example, the first computing device begins a sharing-experience session for the service that supports the first and second actions. In some implementations, the first computing device begins the sharing-experience session responsive to receiving an acceptance of an invitation to begin the sharing-experience session sent to the second computing device.

At 750, an update message is received that includes update information for the service. For example, during the sharing-experience session the first action of the service can be performed when updating the service at the second computing device. Responsive to the first action being performed at the second computing device, it sends an update message with information to recreate the action at the first computing device. For example, the update information includes data that can cause the first computing device to perform the first action, putting the content of the service at the first computing device in a similar and/or same state as the instance of the service at the second computing device.

At 760, the first action of the service is performed based on the received update information. For example, the service at the first computing device receives the update information sent from the second computing device and performs the action directed, using the received update information to update the state of the service according to the update information.

At 770, the first computing device performs the second action of the service. For example, a user of the first computing device uses a user interface to cause the performance of the second action of the service at the first computing device. The performance of the second action of the service changes the state of the service.

At 780, based on the performing of the second action, a second update message is sent that includes second update information for the service. For example, responsive to performing the second action, the first computing device sends an update message to the second computing device during the sharing-experience session, so that the second computing device can use the update information to update the state of the service at the second computing device to reflect the action taken at the first computing device. The second update information can be different than the first update information because the second update information includes information that can be used to recreate the action taken by the instance of the service at the first computing device by invoking and/or performing the second action at the second computing device as directed by the second update information.

In some implementations of a sharing-experience session during a communications call, the sharing-experience session can be ended. The communications call can continue after the sharing-experience has ended. Messages are no longer authorized to be sent between the participants of the previously initiated sharing-experience session, however. After a sharing-experience session has ended, the content of the service and/or the data received during the sharing-experience session can be stored. For example, the data of the sharing-experience session can be stored locally at the device on computer-readable media and/or the data can be stored remotely in online storage such as in cloud storage or the like.

In some implementations of a sharing-experience session, during the sharing-experience session, additional devices can join or initiate participation with the sharing-experience session after the sharing-experience session has begun. Also, during a sharing-experience session, a computing device that is a party to the sharing-experience session can leave the sharing experience-session without the sharing-experience session ending if there are at least two other computing devices that are continuing parties of the sharing-experience session. In some implementations, when one of the last two participants of a sharing-experience session leaves the sharing-experience session, the sharing-experience session can be ended.

Exemplary Mobile Device

Figure 8:
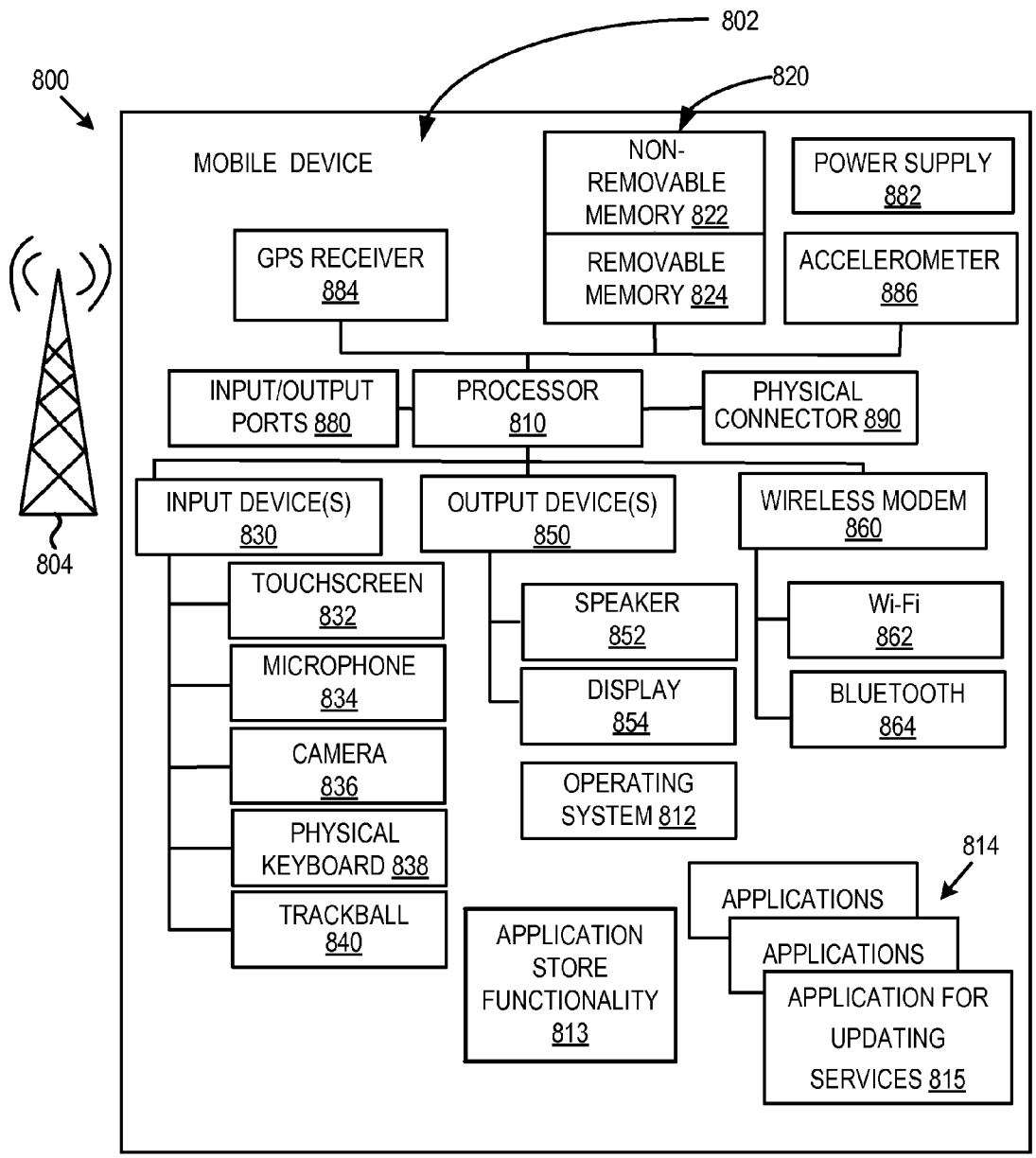
FIG. 8 is a schematic diagram illustrating an exemplary mobile device with which any of the disclosed embodiments can be implemented.

FIG. 8 is a system diagram depicting an exemplary mobile device 800 including a variety of optional hardware and software components, shown generally at 802. In general, a component 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular or satellite network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more of the application programs 814, 815. The application 815 can include one or more software modules that implement one or more of the technologies described herein, such as updating a service during a sharing-experience session. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application or other application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can deleted and other components can be added.

Exemplary Implementation Environment

Figure 9:
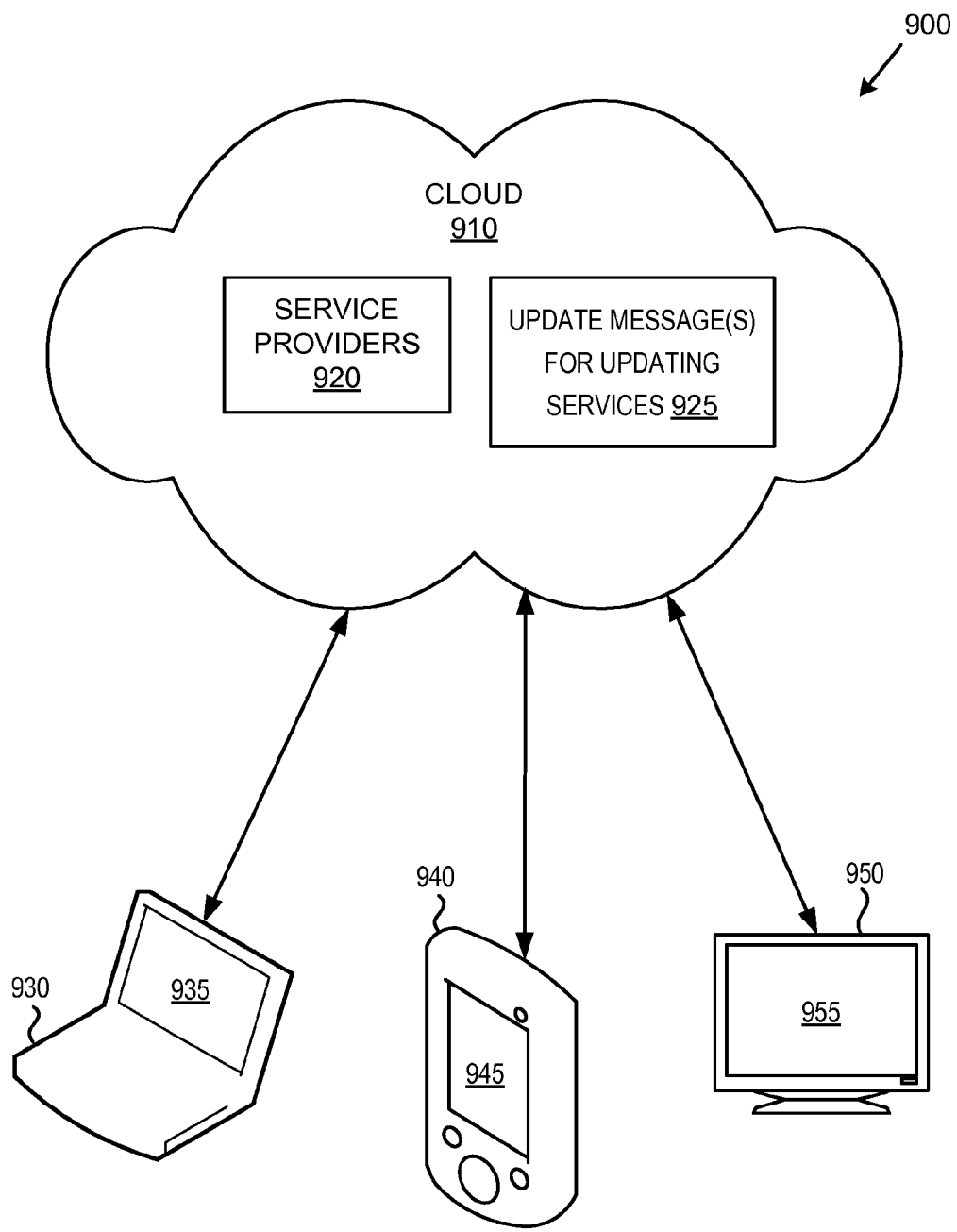
FIG. 9 is a schematic diagram illustrating a generalized example of a suitable implementation environment for any of the disclosed embodiments.

FIG. 9 is a diagram that illustrates a generalized example of a suitable implementation environment 900 in which described embodiments, techniques, and technologies may be implemented.

In example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, or the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, and 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users). The cloud 910 can provide one or more services by exchanging one or more update messages 925 for updating services in a sharing-experience session during a communications call.

Exemplary Computing Environment

Figure 10:
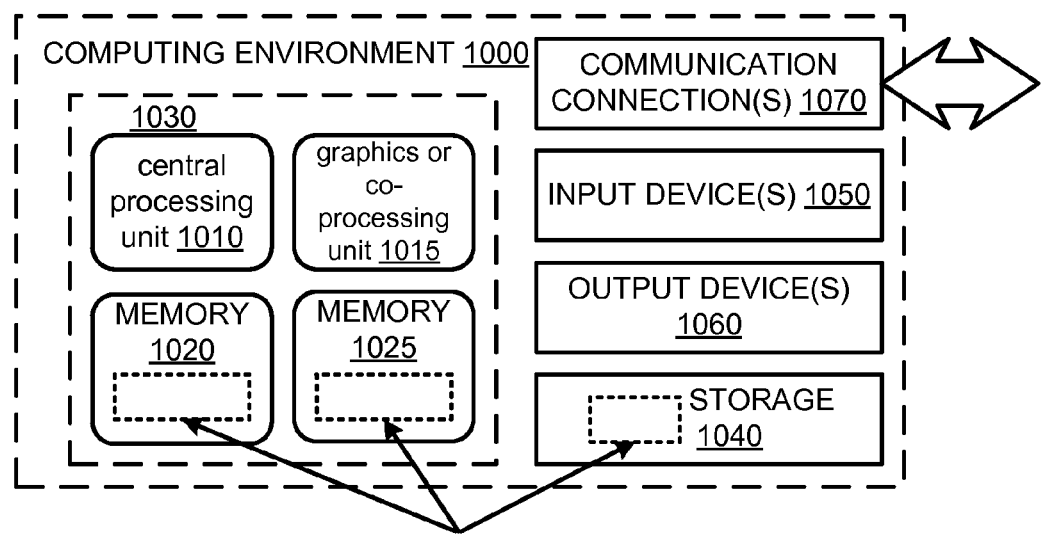
FIG. 10 is schematic diagram illustrating a generalized example of a suitable computing environment for any of the disclosed embodiments.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, media player, gaming system, mobile device, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a tangible way and which can be accessed within the computing environment 1000. The storage 1040 stores instructions for the software 1080 implementing one or more innovations described herein such as updating services in sharing-experience services.

The input device(s) 1050 may be a touch input device such as a keyboard, mouse, pen, or trackball, a voice input device, a scanning device, or another device that provides input to the computing environment 1000. For video encoding, the input device(s) 1050 may be a camera, video card, TV tuner card, or similar device that accepts video input in analog or digital form, or a CD-ROM or CD-RW that reads video samples into the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method comprising:
   with a first computing device, initiating a communications call to a second computing device;
   receiving, from the second computing device, capability information for the second computing device, the capability information for the second computing device including information indicating attributes of multiple services supported by the second computing device;
   with the first computing device, evaluating the capability information for the second computing device to determine that a first service of the multiple services is supported by the first and second computing devices;
   with the first computing device, initiating a sharing-experience session that includes the first service;
   receiving an update message comprising update information for the first service;
   based on the received update information, updating content of the first service; and
   with the first computing device, allowing initiation of a second service of the multiple services within the sharing-experience session.

2. The method of claim 1, wherein the communications call comprises a call which supports video communication and voice communication using at least a voice over internet protocol.

3. The method of claim 1, wherein the capability information for the second computing device comprises one or more of identifiers of the multiple services, version identifiers of the multiple services, or action identifiers of the multiple services.

4. The method of claim 1, wherein the capability information for the second computing device comprises information indicating, for the multiple services, one or more of actions supported at the second computing device, commands supported at the second computing device, or one or more schema according to which data for the multiple services are organized.

5. The method of claim 1, wherein the capability information for the second computing device indicates device capabilities for the second computing device, the device capabilities including one or more of processing capacity, memory capacity, display resolution and network connection speed.

6. The method of claim 1, wherein the initiating the sharing-experience session comprises sending an acceptance of a request to establish the sharing-experience session or receiving an acceptance of a request to establish the sharing-experience session.

7. The method of claim 1 further comprising sending the capability information for the first computing device, the capability information for the first computing device indicating attributes of the multiple services supported by the first computing device.

8. The method of claim 1, wherein the received update message is a first update message, and wherein the method further comprises:
   sending a second update message responsive to performing an action of the first service at the first computing device, the second update message comprising update information to direct the performance of the action at the second computing device.

9. The method of claim 1, wherein the updating the content of the first service comprises changing a virtual object in a display of the first computing device.

10. The method of claim 1, wherein the initiating the sharing-experience session comprises launching an application for the first service.

11. The method of claim 1 further comprising limiting the capabilities of each service of the multiple services on the first computing device to conform to the capabilities of that service on the second computing device.

12. The method of claim 1 wherein the sharing-experience session is a first sharing-experience session, and wherein the method further comprises:
   with the first computing device, evaluating the capability information for the second computing device to determine that a third service of the multiple services is supported by the first and second computing devices; and
   initiating a second sharing-experience session that includes the third service.

13. A computing device that includes a processor and memory, the memory storing computer-executable instructions for causing the computing device to control interactive communication at the computing device by:
   with the computing device, as a first computing device, initiating a communications call to a second computing device;
   receiving, from the second computing device, capability information for the second computing device, the capability information for the second computing device indicating a first service that is supported by the second computing device;
   with the first computing device, evaluating the capability information for the second computing device to determine that the first and second computing devices support at least one mutual action of the first service;
   with the first computing device, initiating a first sharing-experience session that includes the first service;
   determining that the second computing device does not support at least one action of the first service that is supported by the first computing device;

disabling the at least one action of the first service in the first computing device that is not supported by the second computing device;

with the first computing device, performing a given action of the at least one mutual action of the first service;

sending an update message comprising update information for the given mutual action of the first service; and with the first computing device, initiating a second sharing-experience session that includes a second service that is supported by the first computing device and that is indicated in the capability information for the second computing device.

14. The computing device of claim 13, wherein the performing the given mutual action of the first service comprises changing content displayed for the first service.

15. The computing device of claim 13, wherein the update information comprises data to direct the performance of the given mutual action at the second computing device.

16. The computing device of claim 13, wherein the update information is first update information and the memory further stores computer-executable instructions for causing the first computing device to control interactive communication at the first computing device by:

receiving second update information for the first service; and based on the received second update information, updating content of the first service at the first computing device.

17. The computing device of claim 13, wherein the initiating of the first sharing-experience session is contingent on the initiating of the communications call.

18. The computing device of claim 13, wherein the capability information for the second computing device further indicates attributes of a third service supported by the second computing device, and wherein the memory further stores computer-executable instructions for causing the first computing device to control interactive communication at the first computing device by initiating the third service within the first sharing-experience session of the first computing device.

19. A computer-readable storage medium selected from the group consisting of optical media disc, volatile memory component, and non-volatile memory component, the computer-readable storage medium storing computer-executable instructions for causing a first computing device to control interactive communication at the first computing device by:

with the first computing device, initiating a communications call to a second computing device;

receiving, from the second computing device, capability information for the second computing device, the capability information for the second computing device including information indicating attributes of a first service supported by the second computing device;

with the first computing device, evaluating the capability information for the second computing device and capability information for the first computing device to determine the first and second computing devices both support a first action and a second action of the first service;

with the first computing device, initiating a first sharing-experience session that includes the first service;

based on the capability information for the second computing device, limiting functionality of the first service on the first computing device to conform to functionality of the first service on the second computing device;

receiving a first update message comprising first update information for the first service;

based on the received first update information, performing the first action of the first service;

with the first computing device, performing the second action of the first service;

based on the performing of the second action, sending a second update message comprising second update information for the first service, the second update information comprising data to direct the performance of the second action at the second computing device; and with the first computing device, initiating a second sharing-experience session that includes a second service that is supported by the first computing device and that is indicated in the capability information for the second computing device.

* * * * *